United States Patent [19]

Arnold

[11] 4,452,415
[45] Jun. 5, 1984

[54] BUCKET HOLDER

[76] Inventor: John E. Arnold, 46909 Peck Wadsworth Rd., Wellington, Ohio 44090

[21] Appl. No.: 324,046

[22] Filed: Nov. 23, 1981

[51] Int. Cl.³ .............................................. A47K 1/08
[52] U.S. Cl. .................................. 248/312.1; 248/313
[58] Field of Search ................. 248/312.1, 311.2, 313, 248/210, 211, 301, 303, 304, 305, 306, 307, 308

[56] References Cited

U.S. PATENT DOCUMENTS

| 679,887 | 8/1901 | Clark | 248/211 |
|---|---|---|---|
| 1,283,160 | 10/1918 | Gross | 248/312.1 |
| 1,545,740 | 7/1925 | Cowell | 248/211 |
| 2,544,312 | 3/1951 | Hamilton | 248/312.1 |
| 3,091,424 | 5/1963 | Yegge | 248/312.1 |
| 3,193,234 | 7/1965 | Thurman et al. | 248/313 |
| 3,578,205 | 5/1971 | Ballester | 248/312.1 |
| 3,982,719 | 9/1976 | Kilborne | 248/301 |

FOREIGN PATENT DOCUMENTS 733181  7/1955  United Kingdom ................ 248/211

Primary Examiner—William H. Schultz
Assistant Examiner—Ramon O. Ramirez
Attorney, Agent, or Firm—Gustalo Nunez; Clyde H. Haynes

[57] ABSTRACT

A bucket holder (10) secures a bucket (11) having a lip (14) and a bail (16) on a wall (12). The bucket holder (10) has an outurned lower end (21) to engage the lip (14) of the bucket (11) and also has a clasp provided with upturned and downturned clasp portions (25) and (26) to imprison the bail (16) of the bucket. If desired, a slide lock (30) slidable on the bucket holder may be secured by a stud (34) and wing nut (35) to lock the lip (14) into latching engagement with the outurned lower end (21) of the bucket holder (10).

7 Claims, 3 Drawing Figures

BUCKET HOLDER

BACKGROUND OF THE INVENTION

1. Field to Which Invention Relates

This invention relates to a bucket holder and a bucket securely carried thereby in an upright attitude on a vertical post or wall. The bucket holder is formed from an elongated generally flat strip of spring metal provided with its lower end out turned and cooperative with an adjustable slide to supportingly interlatch with the bucket lip and having at its upper end an adjustable clasp into which the bail is imprisoned.

2. Background Art of the Invention

In the past, buckets have been hung on the side of a wall by using hooks or angle irons fastened to the wall or cast wall brackets which may have a lip on the lower end for engaging the lip of the bucket and some type of pin or hook over which the bail may also be fastened at the upper end of the bracket. Applicants co-pending application Ser. No. 232,734 filed Feb. 9, 1981, now abandoned for bucket teaches a bucket holder constructed from a single piece of spring sheet metal wherein the lower end is upturned in a somewhat "J" shape to engage the lip of the bucket and wherein a spring clasp having interengageable downturned and upturned clasp portions formed from the single sheet of metal at the upper end of the bucket holder, engages the bail of the bucket.

STATEMENT OF THE INVENTION

The present invention relates to a bucket holder and a bucket securely carried thereby for such end purposes as providing water or feed and so forth to animals, for example, horses. One of the problems in providing water for horses is the animals' ability to nose the bucket and remove it from the supporting bracket or bucket holder. In many of the prior fasteners, such as, for example, screwin hooks or angle irons sticking out from the wall, when the bucket is not in place the horse could then easily engage the bucket holder and cause injury to itself. Usually buckets used for this end purpose hold at least twenty quarts of water and thus when full might weigh approximately forty pounds. Since the bucket should be supported about three feet from the ground, it would mean that the person fastening the filled bucket in the bucket holder would have to lift the forty pounds and secure it in the holder without spilling water and securing the bucket tight enough to the wall so that the horse could not easily disengage the bucket and empty the contents.

Therefore, one of the important objects of the present invention is to provide a bucket holder which may be securely fastened to the wall and onto which a pail may be easily positioned regardless of its weight;

A further object of the invention is to provide a bucket holder and a bucket combination which may be easily secured together to support the bucket in an upright attitude and which may also easily be disengaged from each other to remove the bucket from the bucket holder;

A still further object of the invention is to provide a bucket holder onto which a bucket lip and bail may be easily secured and interlatched by a person while holding the bucket with both hands and with the bucket engaging the clasp portions of the bucket holder;

Other objects and advantages may be observed from the following description of the invention in conjunction with the several drawings.

FIGURES OF THE DRAWINGS

DESCRIPTION OF PREFERRED MODEL

Figure 1:
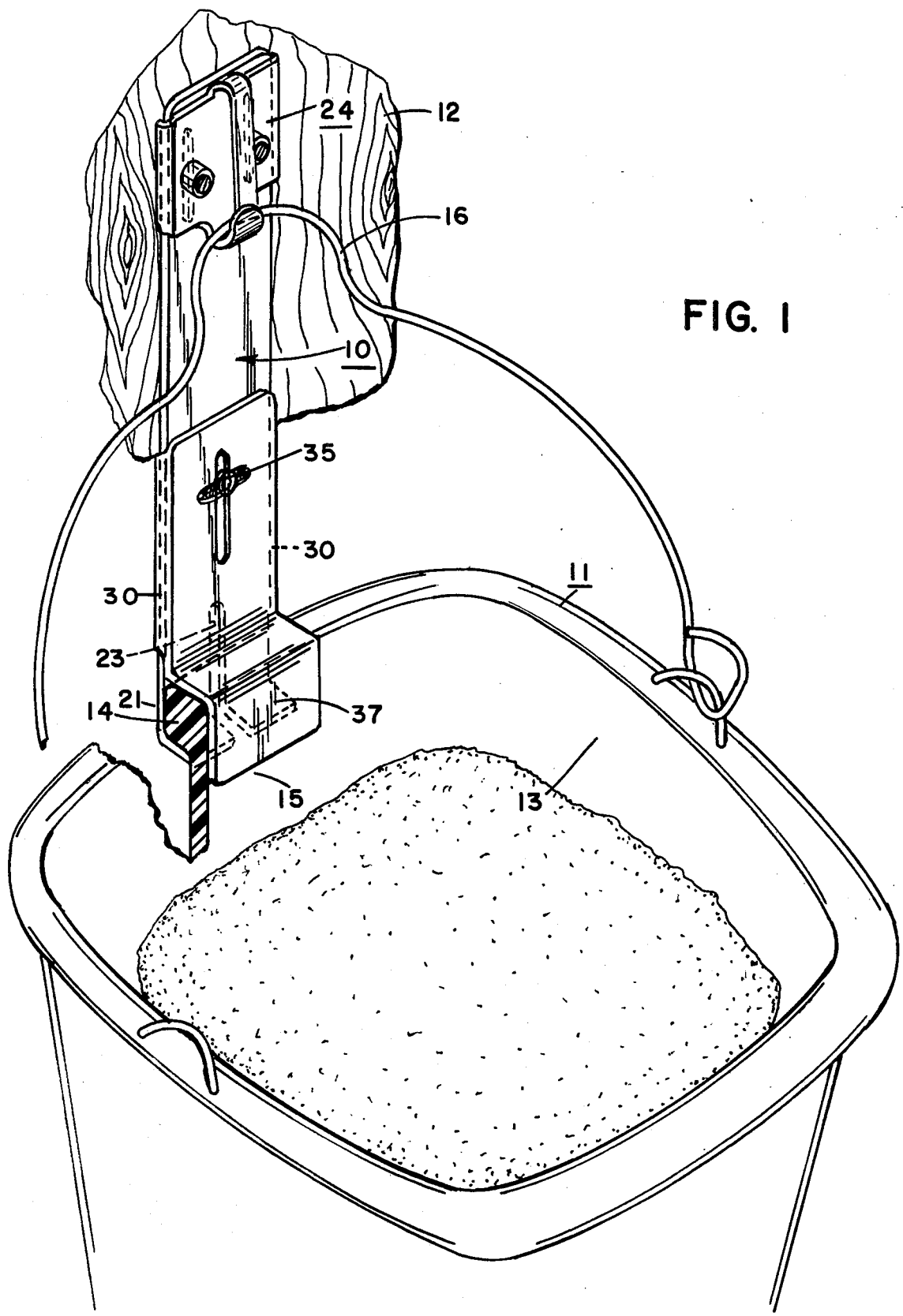
FIG. 1 is a front perspective view of a bucket holder and bucket secured thereby.

The preferred design of my invention is best illustrated in the drawings. In FIG. 1 there is illustrated the combination of a bucket holder 10 and a bucket 11 securely carried thereby in an upright attitude on a side of a wall 12. The bucket 11 has its circumferential wall 13 terminate at its upper end in a lip 14 with the lip protruding outwardly from the bucket wall 13. The bucket wall may be round or it may have a flat portion as illustrated on the side of the bucket engaging the wall. The bucket is further provided with a bail 16.

The bucket holder comprises of an elongated generally flat strip 19 of spring metal or other suitable material provided with an upper end 20 and a lower end 21, interconnected by a wall engageable center portion 22. The upper end 20 and the lower end 21 are thus spaced from each other by the wall engageable center portion 22. The holder 10 is further provided with means, such as for example holes 23 and screws 23', which secure the bucket holder to the wall 12 with the upper end 20 over the lower end 21.

Figure 2:
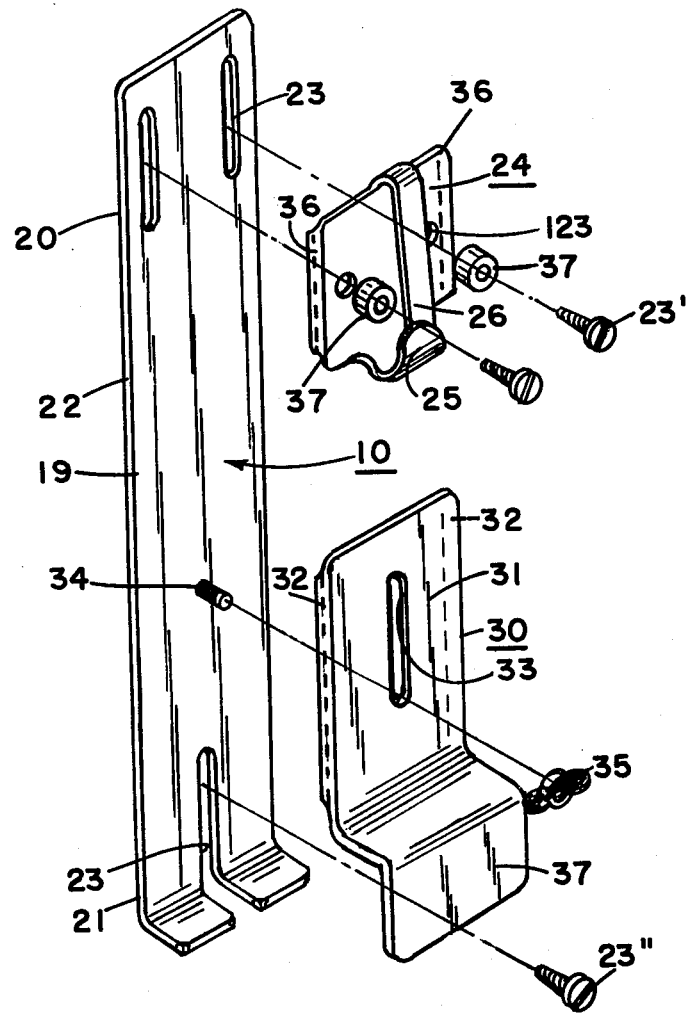
FIG. 2 is an exploded perspective view of the bucket holder of FIG. 1.

As illustrated in FIGS. 1 and 2 of the lower end is out turned into the shape of an "L" to supportingly interlatch with the lip 14 of a bucket 11 placed thereon. The upper end 20 has a clasp 24 including an upturned clasp portion 25 and a downturned clasp portion 26 engaging each other and cooperating to define a bail clasp to clasp the bail 16 of the bucket 11. It is noted that the upturned "L" shaped lower end 21 and the clasp 24 on the upper end 20 extend forwardly of, and on a common side of, the strip 19 in the bucket holder 10. Also, the downturned clasp portion 26 is considerably longer than, and is restricted in movement, by the upturned clasp portion 25, since it extends between the terminal end of the upturned clasp portion and the wall. The downturned clasp portion 26 is normally biased against the upturned clasp portion 25 and is separable therefrom when a bail 16 of a bucket 11 is pressed thereagainst to move the downturned clasp portion 26 rearwardly away from the upturned clasp portion 25 and towards the center portion 22 of the bucket holder 10 or towards the wall 12. In actual operation, the bail of the bucket, having passed between the upturned clasp portion 25 and downturned clasp portion 26, is then moved into a position in which the bail is imprisoned by the clasp portions on the upper end 20 and as illustrated in FIG. 1 in the drawings, simultaneously the lip 14 of the bucket 11 is interlatched with the lower end 21. The simultaneous engagement and interlatching of the lip of the bucket and the bail securely holds the bucket in the bucket holder in an upright attitude.

Even though the bucket holder as thus far described herein will securely hold a bucket in an upright attitude on a wall, I have found that it is preferable to provide a slide lock to further secure the bucket lip on the lower "L" shaped end 21 of the bucket holder 10. In this instance, the slide lock 30 is in the form or shape of an elongated member 31 provided on its opposite sides with ribs 32. The slide lock is vertically slidable on the center portion 22 with the ribs holding the slide lock in the allignment of the bucket holder 10. The elongated member 31 has an elongated slot 33 for receiving a stud 34 mounted on the center portion 22. The slide lock 30 is locked in position by a wing nut 35 and is slidable vertically towards and away from the "L" shaped lower end 21 so as to engage the lip 14 of the bucket 11 with a flange portion 37 overlying and entering the bucket.

In operation and once the bucket holder is secured to the wall, a person may easily hang a bucket full of water on it by grasping the bucket by the bail in both hands, setting the lip on the "L" shaped lower end 21 and snapping the bail into the clasp 24 provided by the upturned and downturned clasp portions 25 and 26. Thereafter, and if desired, the slide lock 30 may be lowered against the lip 14 of the bucket 11 and the wing nut 35 tightened to securely hold the bucket in place. It is thus apparent that both hands may be used to secure the bucket in the bucket holder so that the person does not spill water on himself while securing the bucket in place. When the bucket is to be removed, the wing nut 35 may simply be released to raise the slide lock 30 and the spring downturned clasp portion 26 pushed back towards the wall so that the bail may be slipped out of the upturned clasp portion 25 and the bucket removed for re-filling.

When the clasp 24 is a separate part and the upturned clasp portion 25 and downturned clasp portion 26 are not portions of the strip 19, the clasp is provided with outer guide ribs 36 to engage the opposite sides of strip 19 at the upper end 20. Also, the clasp has holes 123 for receiving the screws 23 which hold the clasp 24 and upper end 20 in selected secured altitude with each other and on the wall. The distance between the L shaped lower end 21 and lower clasp portion 25 is preselected before the screws 23 are screwed in to the wall through holes 123 and slots 23.

Vertical movement of the bail 16 while it is in clasped engagement with the clasp 24 may be limited by means of bushings 37 carried by the screws 23, one on either side of downturned clasp portion 26.

Figure 3:
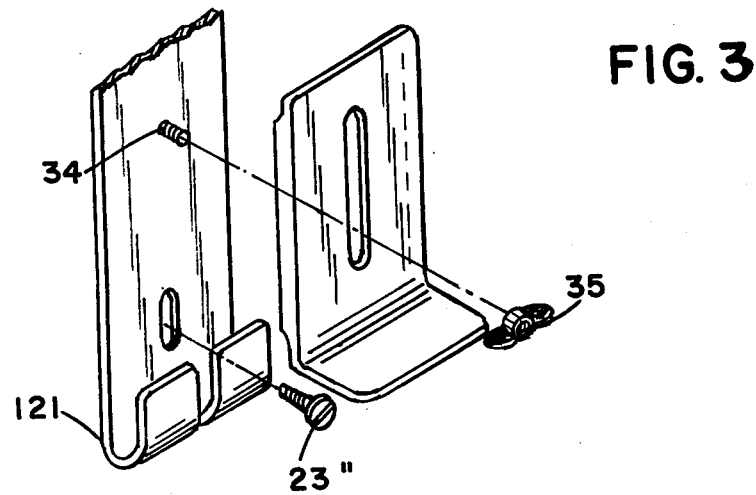
FIG. 3 is a partial exploded perspective view of an alternative form bucket lip engaging lower portion of the bucket holder.

In FIG. 3 the lower end 121 accomodates a bucket in which the lip extends outwardly and then downwardly. The lower end 121 is "J" shaped to hook on the downturned lip.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In the combination of a bucket holder and a bucket securely carried thereby in an upright attitude, the provision of said bucket having an outurned lip and a bail with the bail having a clasp engageable bail portion positionable over and at a certain distance above said lip, said bucket holder consisting of an elongated generally flat strip provided with upper and lower ends interconnected by a wall engageable center portion spacing the upper and lower ends from each other, at least one of said portions having at least fastener means to secure the holder to a vertical wall with the upper end over the lower end, said lower end being outurned to supportingly interlatch with a bucket lip placed thereon, said upper end supporting a clasp having upturned and downturned clasp portions engaging each other and cooperating to define a bail clasp, said lower end and said clasp extending forwardly of and on a common side of said strip, said downturned clasp portion being considerably longer than and restricted in movement by said upturned clasp portion, said downturned clasp portion being normally biased against said upturned clasp portion and being separable therefrom when a bail portion is pressed thereagainst to move said downturned clasp portion rearwardly away from said upturned clasp portion and generally towards said center portion of said strip, and thence moved between the upturned and downturned clasp portions into a position in which the bail portion is imprisoned by said clasp portions on said upper end while said bucket lip is interlatched with said lower end to thereby secure the bucket in an upright attitude.

2. The structures of claim 1 including said lower end being outurned into the shape of an "L".

3. The structure of claim 1 including said lower end being outurned into the shape of a "J".

4. The structure of claim 1 including adjustable lock means mounted on the center portions and movable towards said lower end and into engagement with a lip inserted on the lower end to lock said bucket against vertical movement relative to the lower end and movable away from said lower end to permit vertical movement of said lip out of engagement with said lower end.

5. The structure of the claim 1 including means cooperating with the clasp to limit vertical movement of the bail while it is clasped.

6. A clasp consisting of a sheet of spring material having an upturned clasp portion at its lower end and a downturned clasp portion at its upper end, said downturned clasp portion being longer than said upturned clasp portion and being biased between said upturned clasp portion and said sheet, said sheet having means between the upper end and the lower end thereof for securing it to a wall.

7. The structure of claim 6 including said sheet having ribs, one on each side edge thereof extending between the upper and lower ends thereof.

* * * * *